United States Patent [19] [11] 3,883,830

Hekimian [45] May 13, 1975

[54] LINE CONDITIONER WITH INDEPENDENT GAIN AND DELAY CONTROL

[75] Inventor: Norris C. Hekimian, Rockville, Md.

[73] Assignee: Hekimian Laboratories, Inc., Rockville, Md.

[22] Filed: May 13, 1974

[21] Appl. No.: 469,707

[52] U.S. Cl. ................ 333/28 R; 328/167; 330/107; 330/109; 333/80 R

[51] Int. Cl. ........................................... H03H 7/14

[58] Field of Search ........ 333/28 R, 29, 80 R, 80 T; 328/167; 330/107, 109

[56] References Cited

UNITED STATES PATENTS

| | | | |
|---|---|---|---|
| 3,383,616 | 5/1968 | Friend et al. | 333/28 R X |
| 3,733,565 | 5/1973 | Pierret | 333/28 R |
| 3,818,359 | 6/1974 | Hekimian | 333/28 R X |

*Primary Examiner*—Paul L. Gensler
*Attorney, Agent, or Firm*—Rose & Edell

[57] ABSTRACT

A line conditioner includes plural amplitude and delay equalization circuits which are both physically and functionally independent, whereby both gain and delay in a transmission system can be adjusted with negligible mutual interaction. All adjustment potentiometers are part of a common front panel module which, once adjusted, can be transferred to a replacement system without requiring further adjustment. A novel input amplifier circuit provides good noise figure control and permits wideband linear gain (db) adjustment as a function of potentiometer rotation. Each delay equalization section employs an economical active gyrator circuit as part of a band pass filter having unity gain across the frequency band. Each amplitude equalization circuit likewise includes an economical active gyrator and a gain control potentiometer arranged such that the product of the circuit gain and bandwidth remains substantially constant as the potentiometer is adjusted.

35 Claims, 9 Drawing Figures

LINE CONDITIONER WITH INDEPENDENT GAIN AND DELAY CONTROL

BACKGROUND OF THE INVENTION

The present invention relates to line conditioning equipment of the type which compensates for signal attenuation and delay in transmission lines.

Information signals carried on transmission lines experience attenuation and delay which are dependent upon frequency. In order to transmit information on such lines it is necessary to compensate for this frequency dependent distortion; otherwise, the received signal may be indistinguishable from inter-symbol interference. The problem is particularly applicable to high bit-rate data transmission because of the limitations in the pulse detection capability of electronic equipment in the presence of severe distortion. Prior art attempts to achieve the necessary compensation have employed both passive and active type circuits and circuits having both fixed and variable amplitude and delay characteristics. The most widely accepted approach utilizes a plurality of cascaded tuned active circuits, each having adjustable delay and amplitude characteristics and different center frequencies. This approach permits one to obtain quite acceptable compensation, but the adjustment process is long and tedious. Specifically, the adjustment process involves adjusting the delay in each tuned circuit until the delay across the entire band is equalized. Then the gain in each tuned circuit is adjusted until the gain is equalized across the entire frequency band. Unfortunately, gain adjustments affect delay and vice versa. Consequently repeated adjustments must be made on a cut-and-try basis until the desired equalization is achieved. Usually the procedure takes a number of hours.

One prior art approach to line equalization, in an attempt to minimize interaction between amplitude and delay adjustments, has separated all the delay equalization circuits from the amplitude equalization circuits. The approach has reduced the delay and amplitude adjustment interaction but obviously doubles the number of circuits. This of itself would not be a problem if the individual circuits were themselves economical. However, in order to achieve the desired equalization capability with minimal interaction, four operational amplifiers and numerous resistors and capacitors are used in each circuit. If 12 tuned circuits are used for delay equalization at 12 frequencies, and 12 more tuned circuits are used for amplitude equalization at these frequencies, a total of 96 operational amplifiers and multitudinous passive components are required for all of these circuits. The expense and space requirements become a considerable factor under such circumstances.

Line conditioners and other electronic instrumentation in the prior art often include broad band gain adjustment circuits which have extremely non-linear gain (in db) versus potentiometer setting characteristics. Consequently the gain is extremely sensitive to potentiometer settings over a large portion of the potentiometer range and accurate gain adjustments become difficult. In addition, broadband gain control circuits in line conditioners must have good noise figure control so that the least amount of local noise is introduced onto the transmitted signal.

It is therefore an object of the present invention to provide a line conditioner in which independent amplitude and delay equalization may be achieved with a minimum number of components.

It is another object of the present invention to provide a line conditioner in which delay adjustments and amplitude adjustments have no significant interaction.

It is still another object of the present invention to provide a line conditioner in which all adjustments are made at the front panel.

It is still another object of the present invention to provide a line conditioner in which all gain and delay adjustment potentiometers are part of a module and which once set can be used with other line conditioners without additional adjustment.

It is still another object of the present invention to provide a line conditioner having an adjustable wideband input amplifier having good noise figure control and a linear gain (in db) versus potentiometer characteristic.

SUMMARY OF THE INVENTION

In accordance with one aspect of the present invention, each delay equalizer section of a line conditioner includes a tuned circuit, comprising an active gyrator connected in parallel with a capacitor, coupled between the circuit input terminal and ground through a delay-controlling adjustable resistance. The gyrator, including only two operational amplifiers, has its components selected to provide the circuit with a unity gain response across the entire frequency band, irrespective of the value of the adjustment resistance.

In accordance with another aspect of the present invention, each amplitude equalizer circuit of a line conditioner includes a tuned circuit, comprising an active gyrator connected in parallel with a capacitor and an amplitude-controlling adjustable resistor, all connected between the circuit input terminal and ground. The gyrator includes only two operational amplifiers. A third operational amplifier of unity gain configuration has its non-inverting input terminal connected across the gyrator and its inverting input terminal connected to the circuit input terminal. Changes in the amplitude control resistor have negligible effect on the gain-bandwidth product of the circuit, resulting in negligible effect on circuit delay.

The ground-referenced gain and amplitude control resistors are assembled in a common control module located on the front panel. The module is transferrable to other line conditioners without requiring readjustment of the control resistors.

An input amplifier for the line conditioner employs a differential operational amplifier having the system input signal resistively coupled to its inverting and non-inverting input terminals independently. Resistive negative feedback to the inverting input terminal minimizes the noise figure of the amplifier. A potentiometer is coupled between the non-inverting input terminal and ground to voltage-divide the input signal. This potentiometer is also located in the control module and provides a substantially linear relationship between amplifier gain (in db) and potentiometer setting.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figures 1, 4, 9:
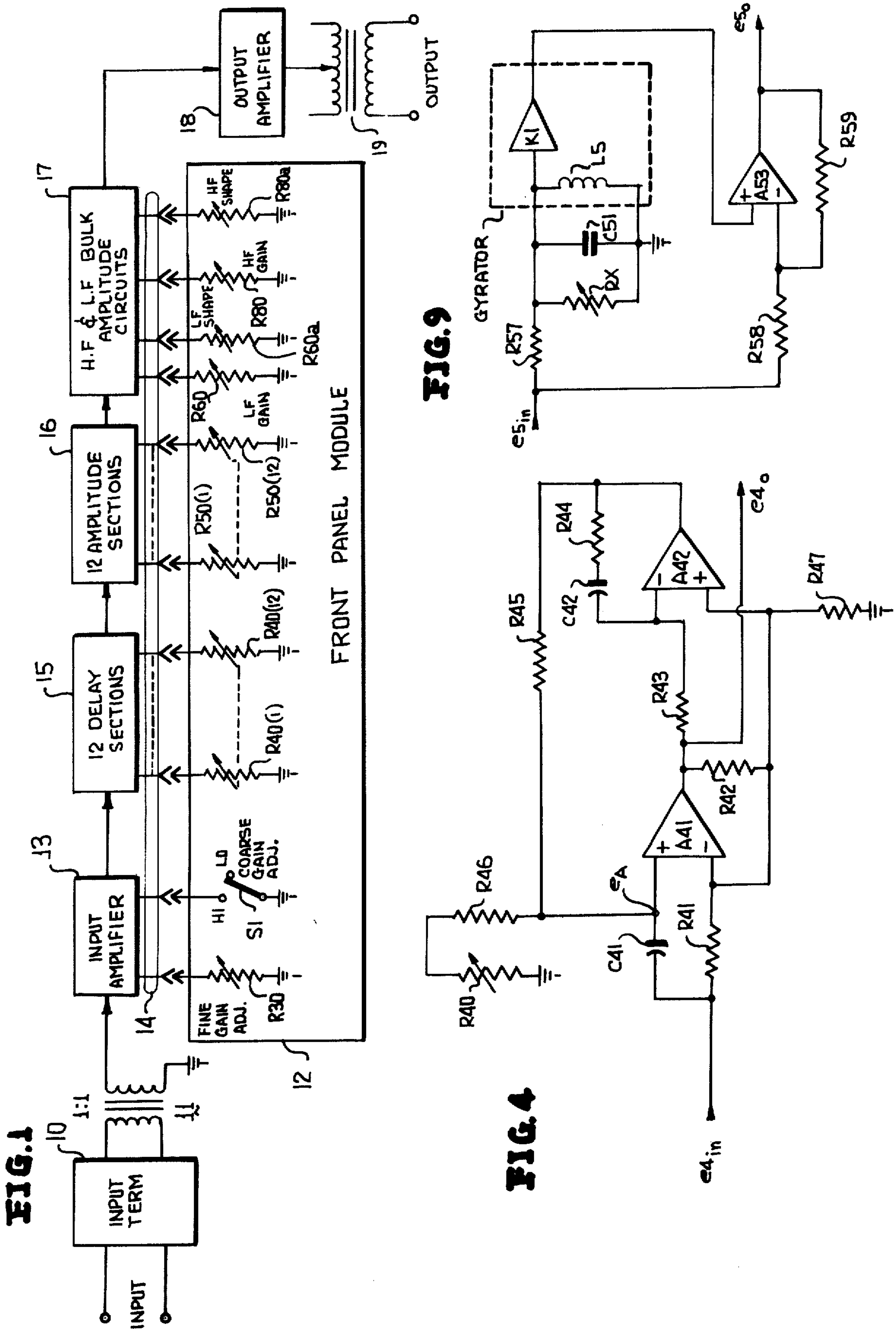
FIG. 1 is a functional block diagram of the line conditioner of the present invention.
FIG. 4 is a schematic diagram of one delay control section of the line conditioner.
FIG. 9 is a schematic diagram of an equivalent circuit for the circuit of FIG. 5.

Referring specifically to the functional block diagram of FIG. 1, input signals on a transmission line to be equalized are applied to a balanced input connection at input termination 10. The signals are then coupled to the equalizer circuitry through isolation transformer 11. The line conditioner includes a front panel 12 in the form of a module which will be described in greater detail below in relation to FIG. 2. An input amplifier 13 serves as a broadband gain control circuit and includes a coarse gain adjustment switch S1 and a fine gain adjustment potentiometer R30. This switch and potentiometer are the only components of circuit 13 which are located in the front panel control module 12. Switch S1 and potentiometer R30 are both referenced to ground so that only one lead is required to connect each to circuit 13. This connection is via a plug-in cable 14 which provides all connections between the front panel module 12 and the other circuits in the line conditioner. The details of amplifier circuit 13 are described in relation to FIG. 3. For present purposes it is sufficient to note that potentioneter R30 provides a continuous broadband gain adjustment between − 10 and +10 db and that switch S1 provides circuit 13 with +20 db of additional gain when closed.

The broadband signal is passed from amplifier circuit 13 to a series of cascaded delay adjustment circuits designated by the reference numeral 15. In the particular system described herein, twelve delay circuits are cascaded, each tuned to a different frequency within the broad signal band. Typically, the delay sections are tuned to frequencies which are successively spaced by 200 Hz steps in a range between 600 and 2,800 Hz. Apart from the necessary component variation to effect different center frequencies and trimming, all 12 circuits are identical. Each of the 12 delay sections includes a respective potentiometer R40(1) through R40(12) which is located at front panel control module 12 and is connected to its respective delay section via cable 13. As described in greater detail in relation to FIG. 4, the R40 potentiometers serve as delay control potentiometers for the respective delay sections. For reasons described below, adjustment of potentiometer R40 for any delay section has no effect on the amplitude response in that section. The importance of this resides in the fact that delay adjustments can be made across the band (i.e. at each of the 12 delay sections) without affecting the amplitude response of the system.

After being equalized for delay the broadband signal is applied to a plurality of cascaded amplitude equalization circuits designated by the reference numeral 16. In the system being described 12 amplitude sections are provided, each tuned to a different frequency within the broad signal band. For purposes of the present description, each amplitude section is tuned to a frequency which corresponds to the center frequency of a respective delay section. Apart from the necessary component variation to effect tuning and trim, each of the 12 amplitude sections are identical. Each amplitude section includes a respective potentiometer R50(1) through R50(12) which is located at front panel model 12 and is connected to its respective amplitude section via cable 14. As described in greater detail in relation to FIG. 5, the R50 potentiometers serve as amplitude control potentiometers for the respective amplitude sections. For reasons described below, adjustment of potentiometer R50 for any delay section has insignificant effect on the delay characteristic in that section. Therefore, amplitude adjustments can be made at each section across the band without affecting the delay response of the system.

The amplitude and delay equalized signal is applied to a pair of cascaded bulk amplitude equalization circuits designated by the reference numeral 17. One bulk equalizer circuit operates to provide adjustment at the low end of the broad frequency band; the other functions similarly at the high end of the band. The low frequency circuit includes a low frequency gain control potentiometer R60 and a low frequency shape (i.e. shape of amplitude versus frequency response characteristic) control potentiometer R60*a*, both located at front panel control module 12. Similarly, the high frequency section includes a high frequency gain control potentiometer R80 and a high frequency shape control potentiometer R80*a*, both located at panel 12. Cable 14 connects potentiometers R60, R60*a*, R80 and R80*a* to their respective bulk equalizer circuit sections. The bulk equalizer sections 17 permit coarse adjustments of the system frequency response and are described in greater detail in relation to FIG. 6.

The delay, amplitude and bulk equalized signal is applied to output amplifier 18 and then coupled through output transformer 19 to ulilization circuitry. Amplifier 18 and transformer 19 serve as a power amplification circuit having a stable output impedance.

Figures 2, 3, 7, 8:
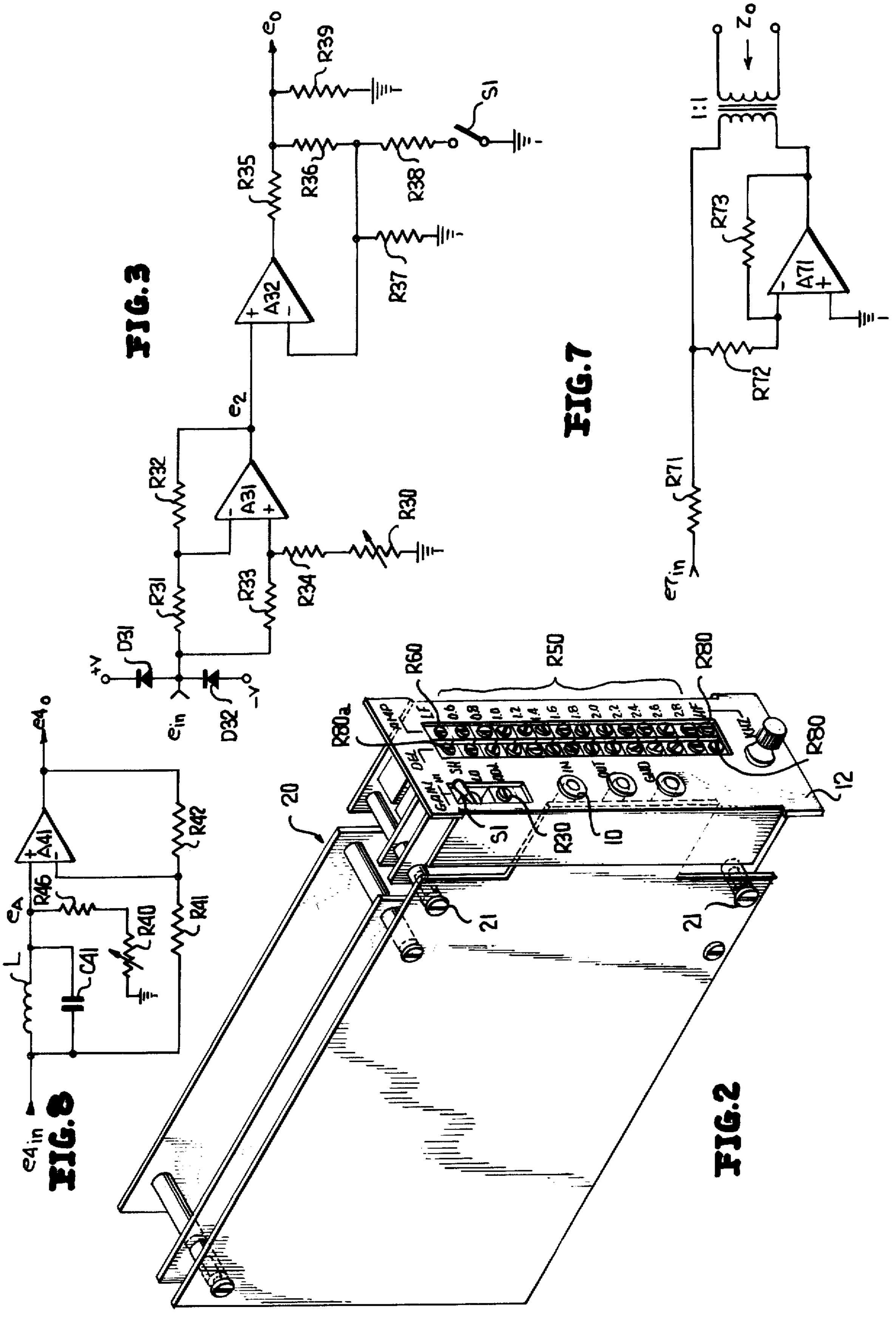
FIG. 2 is a view in perspective of the line conditioner of FIG. 1, illustrating the front panel access and modularity characteristics of the gain and delay adjustment controls.
FIG. 3 is a schematic diagram of a broadband input gain control circuit employed in the line conditioner.
FIG. 7 is a schematic diagram of a broadband output amplifier employed in the line conditioner.
FIG. 8 is a schematic diagram of an equivalent circuit for the circuit of FIG. 4.

Referring specifically to FIG. 2 of the accompanying drawings, the physical unit is depicted. The line conditioner unit constitutes the front panel module 12 and circuit boards section 20. Circuit board section 20 includes all components of circuits 13, 15, 16, 17 and 18 except those potentiometers and the switch on front panel 12. In addition transformers 11 and 19 and the input and output terminals are part of the overall circuit board section. Panel 12 and circuit board section 20 are secured to one another by means of screws 21 so that the two members may be readily separated. Cable 14 (not shown in FIG. 2) provides all electrical connections between the circuit board and the front panel and may be similarly disengaged from the front panel. In this manner front panel 12 may be transferred to other circuit board assemblies. Importantly, once the various delay and amplitude controls have been set at the panel module, they need not be re-adjusted when the module is transferred to a replacement line conditioner circuit board.

As illustrated, all of the controls on panel 12 are readily accessible at the front of the unit. Because each of these controls is referenced to ground, only one lead is required to connect each to circuit board 20 via cable 14. The unit is adaptable for mounting on standard racks or may be otherwise mounted if desired. The unit, which is physically only 3½ inches high, 1⅝ inches wide, and 9½ inches deep, requires very little space and utilizes a minimum of components.

Referring specifically to FIG. 3, the input amplifier 13 is illustrated schematically. The circuit includes differential operational amplifiers A31 and A32, each characterized by high gain, high input impedance and low output impedance. The circuit input signal *e*in is coupled to the inverting input terminal of amplifier A31 via resistor R31 and to the non-inverting input terminal via resistor R33. Negative feedback around amplifier A31 is provided by resistor R32 connected between the amplifier output terminal and the inverting input terminal. The non-inverting input terminal is coupled to ground through resistor R34 connected in series with the fine gain adjustment potentiometer R30 located at the control panel 12.

The output signal $e_2$ from amplifier A31 is coupled to the non-inverting input terminal of amplifier A32. The inverting input terminal of amplifier A32 is resistively coupled to the amplifier output terminal, via series-connected resistors R35 and R36, and to ground via resistor R37. Series connected resistor R38 and front panel coarse gain adjustment switch S1 are connected in series between the inverting input terminal of amplifier A32 and ground. An output resistor R39 is coupled between ground and the junction of resistors R35 and R36.

The primary function of the circuit illustrated in FIG. 3 is to provide both fine and coarse gain adjustment capabilities over the entire frequency band of the input signal. The components associated with amplifier A31 provide a fine gain adjustment capability. Specifically, adjustment of potentiometer R30 changes the gain of the circuit over a continuous range which depends upon component values. For the component values indicated in Table I hereinbelow, a gain adjustment range from −10 to +10 db is achievable. It is important to note that the gain in db is substantially linearly related to the value of R30, so that fine adjustment control is possible over the entire gain adjustment range. Specifically, it may be shown that the gain of the first stage in the circuit of FIG. 3 can be represented as $$\frac{e2}{e_{in}} = \frac{(A31)\left[\frac{(R30+R34)}{R33+R30+R34} - \frac{R32}{R31+R32}\right]}{\left[1 + \frac{(A31)(R31)}{R31+R32}\right]} \qquad (1)$$

wherein $e_2$ is the voltage at the output terminal of amplifier A31, $e_{in}$ is the circuit input voltage, A31 is the gain of amplifier A31, and R30 through R34 are the resistance values of the respective resistors. Plotting the gain in db (i.e. 20 log $e2/e_{in}$) as a function of potentiometer R30, using the values in Table I for convenience (with A31 considered high, on the order of at least 300), a very close approximation to a linear function results. This permits the overall gain to be accurately adjusted to virtually any setting within the prescribed range.

Another important characteristic of the first stage in FIG. 3 is excellent noise figure control exhibited by the amplifier. It is important that the circuit does not introduce significant noise into the signal being transmitted on the equalized line. A common source of noise is present at the input terminals of operational amplifiers and if not controlled can be amplified considerably. It is conventional to apply the input signal to only one of the input terminals of the operational amplifier. If that were done for amplifier A31, and if the gain adjustment potentiometer were connected between that terminal and ground, the degenerative effect of the negative feedback on the noise source would be reduced by the potentiometer. In the illustrated circuit, however, the potentiometer is isolated from the negative feedback which acts to degeneratively control the local noise.

The coarse gain portion of the circuit of FIG. 3 includes the components associated with amplifier A32. Switch S1 acts to change the gain of this portion of the circuit by changing the amount of negative feedback applied to the amplifier. When S1 is open only resistor R37 acts as a voltage divider with R36 for the negative feedback. When the switch is closed the effect of R37 is reduced by R38 connected in parallel therewith so that less feedback voltage is applied across the inverting input terminal of amplifier A32. For the component values indicated in Table I the gain of the second stage changes from +6 db with SW1 open to +26 db with SW1 closed.

Diodes D31 and D32 are connected in series between the positive and negative supply voltages +V and −V, respectively. The junction between the diodes is connected to the circuit input terminal. The diodes prevent the input voltage $e_{in}$ from exceeding the supply voltages in either sense and thereby over-driving amplifier A31. The voltage division between R33 and R34, R30 provides further assurance against too high an input signal level.

Specific reference is now made to FIG. 4 wherein one of twelve delay sections 15 of FIG. 1 is illustrated schematically. Input signal $e4_{in}$ is coupled through capacitor C41 to the non-inverting input terminal of differential operational amplifier A41 and through resistor R41 to the inverting input terminal of that amplifier. The non-inverting input terminal is coupled to ground through series-connected resistor R46 and delay control potentiometer R40 at the control panel. A negative feedback resistor R42 is connected between the output terminal and the inverting input terminal of amplifier A41.

A second operational amplifier A42 has its inverting input terminal coupled to the output terminal of amplifier A41 through resistor R43. The non-inverting input terminal of A42 is directly connected to the inverting input terminal of A41 and is coupled to ground through resistor R47. Negative feedback is provided for amplifier A42 by means of a series-connected resistor R44 and capacitor C42 coupled between the amplifier output terminal and inverting input terminal. A feedback resistor R45 connects the output terminal of amplifier A42 to the non-inverting input terminal of amplifier A41.

With the exception of capacitor C41 and resistors R40, R46 and R47, the circuit of FIG. 4 may be recognized as the active gyrator disclosed in FIG. 2 of my copending U.S. patent application Ser. No. 401,591, filed Sept. 28, 1973, now Pat. No. 3,824,496. That patent application described in detail the fact that the gyrator reliably simulates an inductance without requiring inductive components and uses a minimum number of components. The primary difference between that gyrator and the one in the delay section of FIG. 4 is the fact that R41 is not grounded as it is in the aforementioned patent application but instead provides resistive input signal coupling to the inverting input terminal of amplifier A41. The effect is essentially to provide a floating inductance between $e_A$ and $e4_{in}$ rather than a grounded, simulated inductance between $e_A$ and ground. The gyrator in FIG. 4 may therefore be looked upon as a simulated inductance connected in series with the input terminal of an amplifier of some gain K depending upon the gains of amplifiers A41 and A42 and the circuit components. The value L of the simulated inductance, as described in the aforesaid patent application, is approximately $$L = \frac{(R41)(R43)(R45)}{(R42)(Z)} \qquad (2)$$

where Z is the impedance of the series combination of capacitor C42 and resistor R44.

In view of the foregoing the circuit of FIG. 4 may be viewed as having the equivalent circuit illustrated in FIG. 8. Specifically, the input signal $e4_{in}$ is applied through parallel connected inductor L and capacitor C41 to non-inverting input of amplifier A41. L is the simulated inductance given by expression (2). The non-inverting input terminal of amplifier A41 is resistively coupled to ground through R46 and R40. By standard nodal analysis at the non-inverting input terminal to amplifier A41 it is possible to derive the following expression:

$$\frac{eA}{e4_{in}} = \frac{s^2 + \frac{1}{LC}}{s^2 + \frac{Gs}{c} + \frac{1}{LC}} \qquad (3)$$

where $e_A$ is the voltage at the non-inverting input terminal to amplifier A41, $s$ is the transform operator equal to $jw$, and G is the conductance of R40 and R46 connected in series or 1/R40 + 1/R46.

Referring back to FIG. 4 we note that the output signal $e4_o$ is seen to be capable of representation as follows:

$$e4_o = e_A \frac{R41+R42}{R41} - e4_{in} \frac{R42}{R41} \qquad (4)$$

Re-arranging terms provides an expression for the circuit gain, to wit:

$$\frac{e4_o}{e4_{in}} = \frac{e_A}{e4_{in}} \left(\frac{R41+R42}{R41}\right) - \frac{R42}{R41} \qquad (5)$$

Substituting for $e_{A/e4in}$ from expression (3) and simplifying terms yields:

$$\frac{e4_o}{e4_{in}} = \frac{s^2 - \frac{R42}{R41}\frac{G}{C}s + \frac{1}{LC}}{s^2 + \frac{G}{C}s + \frac{1}{LC}} \qquad (6)$$

If R42=R41, expression (6) reduces to the so-called second order all pass network transfer function having the general form $$H(s) = \frac{s^2 - a\,s + b}{s^2 + a\,s + b} \qquad (7)$$

where $a$ and $b$ are constants. It is well known that such a network has unity gain across the frequency band for all values of $a$. However, $a$ does affect the delay characteristic of the network. Relating this to expression (6) it is noted that variation of G has the effect of varying $a$ in expression (7) so that G can be varied to change the circuit delay but will not destroy the flat unity gain characteristic. Since G is the combined conductance of R40 and R46 in FIG. 4, it is apparent that R40 may be used to provide a delay adjustment capability without affecting the circuit gain. Of course this feature depends upon R41 and R42 being equal.

Typical values for circuit components in FIG. 4 are listed in Table I. No values are listed for R43, R44, and R47 because these component values are or may be different in the 12 delay sections. Specifically, R43 is the primary frequency-determining component; it is selected on the basis of which center frequency is to be used for the delay section. It may be desirable to separate R43 into two resistors, one of which is custom-inserted to provide a fine frequency trim at the time of assembly in order to compensate for production variations in the amplifiers. R44 provides a trim function for the simulated inductance at the time of assembly; it assures that there is no possibility of negative circuit conductance. R47 compensates for any stray capacitance which might appear between the non-inverting input terminal of amplifier A42 and ground to disturb the unity gain characteristic.

Figure 5:
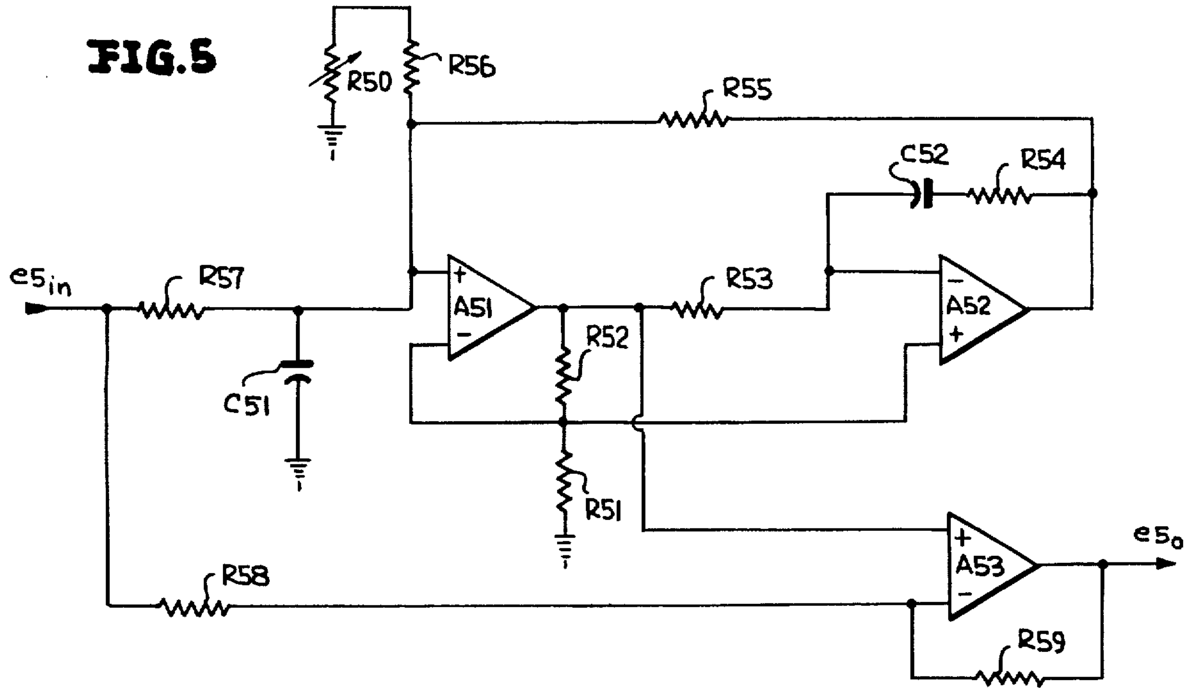
FIG. 5 is a schematic diagram of one amplitude control section of the line conditioner.

Referring to FIG. 5, one of the twelve amplitude equalizer sections 16 of FIG. 1 is illustrated in detail. Input signal $e5_{in}$ is resistively coupled through R57 to the non-inverting input terminal of a differential operational amplifier A51. That terminal is returned to ground through capacitor C51 and also through series connected resistor R56 and potentiometer R50. It will be noted that the potentiometer is the amplitude control for the section and is located at front panel 12. The inverting input terminal of amplifier A51 is referenced to ground through resistor R51 and also receives negative feedback from the amplifier output terminal through feedback resistor R52. Resistor R53 is connected in series between the output terminal of A51 and the inverting input terminal of another differential operational amplifier A52. The non-inverting input terminal of A52 is connected to the junction between R51 and R52. Negative feedback is provided from the output terminal to the inverting input terminal of amplifier A52 by resistor R54 and capacitor C52 connected in series. Resistor R55 provides feedback from the output terminal of A52 to the non-inverting input terminal of A51.

Another differential operational amplifier A53 serves as the output amplifier for the circuit of FIG. 5. The non-inverting input terminal of A53 is coupled directly to the output terminal of A51. The inverting input terminal of A53 receives input signal $e5_{in}$ through resistor R58 and receives negative feedback through resistor R59 from the amplifier output terminal.

Components A51, A52, R51 through R55 and C52 will be recognized as the gyrator disclosed in FIG. 2 of my U.S. patent application Ser. No. 401,591. filed Sept. 28, 1973. The gyrator provides a simulated inductance L5 which may be represented as follows:

$$L5 = \frac{(R51)(R53)(R55)}{(R52)(Z5)}$$

where Z5 is the impedance of the series combination of capacitor C52 and resistor R54. The gyrator may be thought of as a ground-referenced inductor having a value L5 and connected across the input terminal of an amplifier having a gain K1. This equivalent circuit representation is illustrated in FIG. 9 which also shows the relationship of capacitor C51, resistors R57, R58, R59 and amplifier A53 to the gyrator of FIG. 5. In addition, variable resistor RX, connected across capacitor C51 and inductor L5 in FIG. 9, corresponds to the series combination of resistor R56 and potentiometer R50 in FIG. 5.

The circuit of FIG. 5 (and the equivalent circuit in FIG. 9) has a gain characteristic which is adjustable by means of R50 (or RX) and a delay characteristic which is insignificantly affected by R50 (or RX). It can be proven by mathematical analysis that, with a single control element, circuit delay cannot be made absolutely independent of gain. Therefore, for the amplitude section, it is desirable to find a configuration in which the dependence of delay upon gain is both minimum and insignificant. The fact that delay is both minimally and insignificantly affected by variations in RX is demonstrated by the following analysis.

The transfer function of the equivalent circuit in FIG. 9 takes the following general form (for R59 = R58):

$$\frac{e5_o}{e5_{in}} = 1 - 2F(s), \tag{8}$$

where F(s) is the transfer function relating the signal at the output terminal of amplifier A51 to $e5_{in}$. This F(s) function may be represented in terms of circuit components as follows:

$$F(s) = \frac{\frac{s}{(R57)(C51)}}{s^2 + \frac{1}{C51}\left(\frac{1}{R57} + \frac{1}{RX}\right)s + \frac{1}{(L5)(C51)}} \tag{9}$$

This expression is recognized as the transfer function of a bandpass filter and may be generalized to take the form It is well known that a bandpass filter of the type whose transfer function is represented by expression (10) has a center frequency ($W_o$) equal to $\sqrt{b}$.

Referring back to expression (8), the transfer function for the overall circuit of FIG. 5 (or FIG. 9), and substituting $f(s)$ of equation (10) for F(s):

$$\frac{e5_o}{e5_{in}} = \frac{s^2-(2a-x)s+b}{s^2+xs+b} \tag{11}$$

At the center frequency ($W_o$), the circuit transfer function becomes $$G = \frac{e5_o}{e5_{in}}(W_o) = \frac{2a-x,}{x} \tag{12}$$

and it can be shown that the circuit delay T at the center frequency becomes $$T(W_o) = 2\left(\frac{1}{2a-x} + \frac{1}{x}\right). \tag{13}$$

In order to ascertain the dependence of delay upon gain at the center frequency we shall solve for $x$ in terms of G in expression (12) and substitute for $x$ into expression (13). Proceeding in this manner, $$x = \frac{2a}{G+1} \tag{14}$$

and $$T(W_o) = \frac{1}{a}\left(G + 2 + \frac{1}{G}\right). \tag{15}$$

From expression (15) is can be seen that within a range of ± 4 db variation in G, the delay change is on the order of 5 percent and therefore is insignificant in the present context.

It should also be pointed out that the delay in a circuit such as that of FIG. 5 (or FIG. 9) is dependent upon midband gain and the bandwidth of the bandpass filter section whose transfer function is represented by expressions (9) and (10). Specifically, the product of the mid-band gain (i.e. the gain at $W_o$) and the bandwidth should be maintained constant to assure minimal dependency of circuit delay upon circuit gain. Referring to expression (10), the quality factor Q for the filter may be represented as $Q = \sqrt{b}/x$. The filter bandwidth, in turn, may be represented by $$BW = \frac{W_o}{Q} = x. \tag{16}$$

The mid-band filter gain ($s=jW_o$) may be represented by $$f(W_o) = \frac{a}{x}. \tag{17}$$

$$f(s) = \frac{as}{s^2 + xs + b} \tag{10}$$

where $a = \frac{1}{(R57)(C51)}$; $x = \frac{1}{C51}\left(\frac{1}{R57} + \frac{1}{RX}\right)$; and $b = \frac{1}{(L5)(C51)}$.

The product of the filter bandwidth and mid-band gain is therefore $$(BW) \cdot f(W_o) = x \cdot \frac{a}{x} = a \qquad (18)$$

which is independent of $x$. Since $x$ represents the gain adjustment variable in each amplitude section (as described in relation to expression 10), it is clear that the gain can be adjusted via R50 without affecting the product of mid-band gain and bandwidth of the filter; hence the delay is insignificantly affected by R50.

Figure 6:
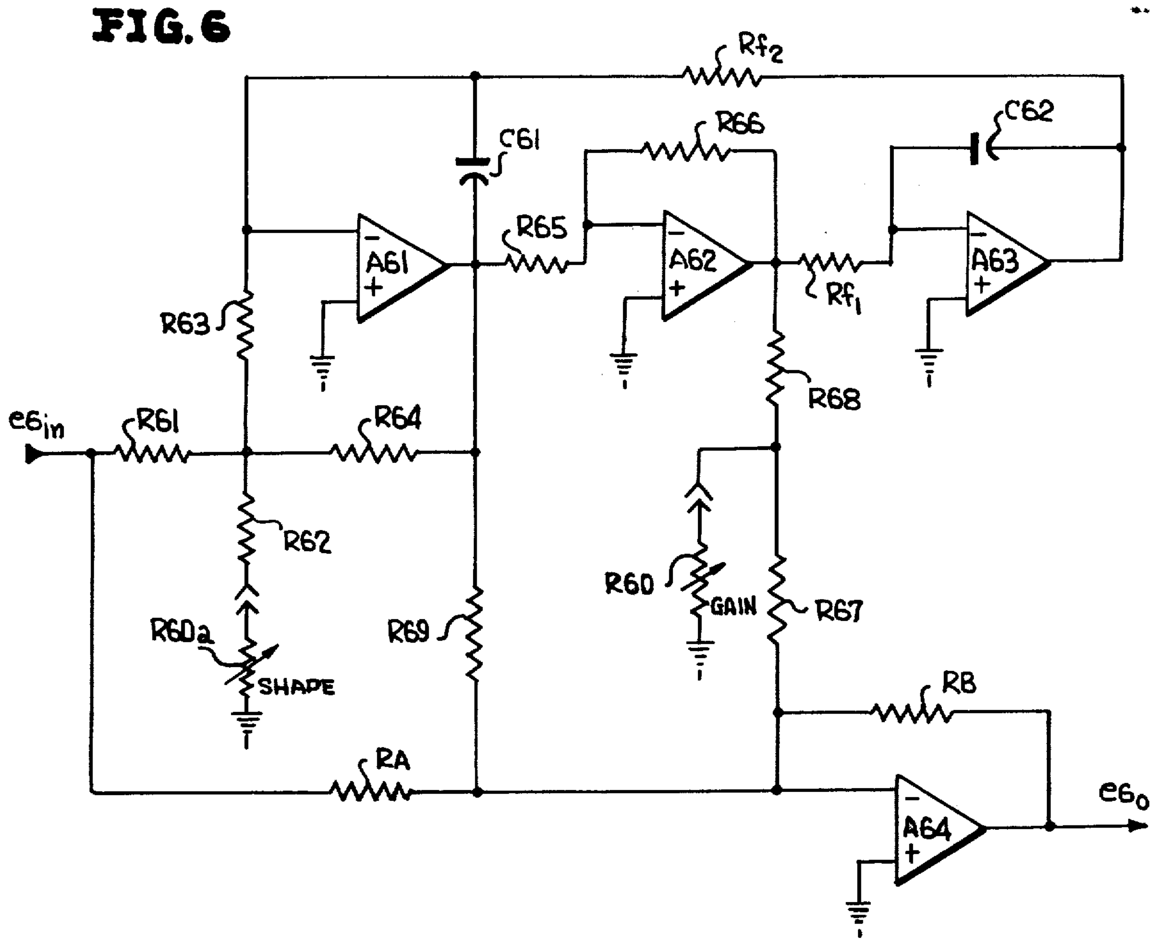
FIG. 6 is a schematic diagram of one of two bulk equalizer sections of the line conditioner.

One of the two bulk equalizer sections of the line conditioner is illustrated in FIG. 6. Each bulk equalizer section provides means for compensating for variations at respective ends of the system passband. The two sections are identical except for the values of two center frequency-determinative resistors in each circuit. Each section includes a state-variable bandpass filter comprising operational amplifiers A61, A62 and A63, and a unity gain amplifier comprising operational amplifier A64.

The inverting input terminal of amplifier A61 receives input signal $e6_{in}$ through series-connected resistors R61 and R63. The junction between R61 and R63 is coupled to ground via series-connected resistor R62 and shape control potentiometer R60*a* located at control panel 12. Negative feedback is provided from the output terminal of amplifier A61 through resistor R64. The output terminal of amplifier A61 is coupled to the inverting input terminal of amplifier A64 via resistor R69.

The inverting input terminal of amplifier A62 is coupled to the output terminal of A61 via resistor R65. Negative feedback is provided around A62 by resistor R66. The output terminal of amplifier A62 is returned to ground through the series-connected resistor R68 and gain control potentiometer R60 located at control panel 12. The junction between R68 and R60 is coupled to the inverting input terminal of amplifiers A64 via resistor R67.

Resistor $R_{f1}$ is connected in series between the output terminal of amplifier A62 and the inverting input terminal of amplifier A63. A capacitive feedback is provided by C62 between the output terminal and inverting input terminal of amplifier A63. Resistor $R_{f2}$ is coupled between the output terminal of amplifier A63 and the inverting input terminal of amplifier A61.

The inverting input terminal of amplifier A64 receives input signal $e6_{in}$ through resistor RA. Resistor RB provides negative feedback around amplifier A64 which provides the circuit output signal $e6_o$. The non-inverting input terminals of amplifiers A61 through A64 are grounded.

Resistors $R_{f1}$ and $R_{f2}$ are the frequency determinative components of the circuit and are different for the high and low frequency sections.

Potentiometer R60 is used to control the section gain, boosting or lowering signal amplitude at the end of the passband served by the circuit. Potentiometer R60*a* controls the section bandwidth, acting to shape the frequency response as necessary to compensate for distortion at the end of the passband. The circuit is essentially conventional in nature but cooperates with the novel amplitude and delay sections to provide full bandwidth equalization.

Output amplifier 18 is illustrated in detail in FIG. 7. The input signal $e7_{in}$ is received from the second bulk equalizer section and applied through series-connected resistor R71 and R72 to the inverting input terminal of operational amplifier A71, the non-inverting terminal of which is grounded. A negative voltage feedback path is provided by resistor R73 connected between the output and and inverting input terminals of A71. The primary winding of output transformer 19 is connected between the output terminal of A71 and the junction between R71 and R72. Negative feedback current flows through the primary winding and resistor R71, and a voltage proportional to this current is applied to the amplifier via R72.

The combination of the current and voltage feedback provides a stable output impedance transformation across the secondary winding of the transformer. The voltage feedback tends to maintain the voltage constant across the load and thereby tends to lower the circuit output impedance. The current feedback tends to maintain constant load current and thereby tends to increase the output impedance of the circuit. The two opposing tendencies combine to provide a highly stable circuit output impedance.

By conventional analysis it can be shown that the circuit output impedance $Z_o$ can be represented as follows:

$$Z_o = \frac{(R71)(R72)}{(R71)+(R72)}\left(1+\frac{R73}{R72}\right) \qquad (19)$$

To design for a matched gain condition, wherein the output voltage level limits for the same level of $e7_{in}$ and the output voltage from A71, then R73 = 2(R71+R72). But R71 should be very small relative to R72 in order to effect minimal loss in the current feedback path. Therefore R73 should have a value approximately twice that of R72. Considering expression (19) under these circumstances we find $$Z_o = R71\ (1+2) = 3R71 \qquad (20)$$

Thus, the driving circuit for the output amplifier feeds a relatively low resistance R71 yet the output impedance is three times that. The result is to make available considerably more output power than would be the case without the transformation. The value of R71 should be diminished due to the winding resistances of the output transformer. A value of 172 ohms would be used instead of 200 ohms in a typical instance of a 600 ohm output impedance.

The circuits described herein will operate for a variety of component values. For the purposes of the present description however, an operable system has been constructed with the component values listed in the following Table.

TABLE I

| Component | Value |
|---|---|
| R30 | 50 K ohms |
| R31 | 20 K ohms |
| R32 | 82 K ohms |
| R33 | 20 K ohms |
| R34 | 5.6 K ohms |
| R35 | 1.5 K ohms |

TABLE I-Continued

| Component | Value |
|---|---|
| R36 | 9.1 K ohms |
| R37 | 9.1 K ohms |
| R38 | 1.0 K ohms |
| R39 | 3.0 K ohms |
| R40 | 50 K ohms |
| R41 | 10 K ohms |
| R42 | 10 K ohms |
| R43 | (depends on center frequency) |
| R44 | (depends on amplifier characteristic) |
| R45 | (depends on center frequency) |
| R46 | 12.5 K ohms |
| R47 | (depends on stray capacitance) |
| R50 | 100 K ohms |
| R51 | 10 K ohms |
| R52 | 8.06 K ohms |
| R53 | (depends on center frequency) |
| R54 | (depends on amplifier characteristic) |
| R55 | (depends on center frequency) |
| R56 | 49.9 K ohms |
| R57 | 60.4 K ohms |
| R58 | 10 K ohms |
| R59 | 10 K ohms |
| R60 | 2 K ohms |
| R60a | 50 K ohms |
| R61 | 49.7 K ohms |
| R62 | 1.84 K ohms |
| R63 | 49.7 K ohms |
| R64 | 49.7 K ohms |
| R65 | 49.7 K ohms |
| R66 | 49.7 K ohms |
| R67 | 953 ohms |
| R68 | 2 K ohms |
| R69 | 40 K ohms |
| $R_n$ | (depends on center frequency) |
| RA | 20 K ohms |
| RB | 20 K ohms |
| R71 | 172 ohms |
| R72 | 10 K ohms |
| R73 | 20 K ohms |
| R80 | 2 K ohms |
| R80a | 50 K ohms |
| C41 | .01 uf |
| C42 | .01 uf |
| C51 | .01 uf |
| C52 | .01 uf |
| C61 | 1000 pf |
| C62 | 1000 pf |

While I have described and illustrated specific embodiments of my invention, it will be clear that variations of the details of construction which are specifically illustrated and described may be resorted to without departing from the true spirit and scope of the invention as defined in the appended claims.

I claim:

1. A line conditioner system providing adjustable compensation for frequency-dependent distortion introduced by a transmission line onto signals within a prescribed frequency range which are transmitted along the transmission line, said system comprising:

broadband input amplifier means arranged to receive signals from said transmission line, said broadband amplifier having an adjustable gain for all signal frequencies in said prescribed frequency range;

a plurality of cascaded delay circuits connected in cascade with said broadband amplifier means, each delay circuit being tuned to a different frequency within said prescribed frequency range and including delay adjustment means for adjusting signal delay therethrough in a relatively small range of frequencies centered at said tuned frequency, each delay circuit having a constant gain versus frequency characteristic;

a plurality of cascaded amplitude circuits connected in cascade with said delay circuits, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vary the bandwidth and mid-band frequency gain of said circuit such that the product of said bandwidth and mid-band frequency gain is independent of adjustments of said amplitude adjustment means; and output amplifier means connected in cascade with said delay and amplitude circuits for providing an output signal from said system and providing a system output impedance which is matched to a predetermined impedance;

wherein each of said delay circuits includes:

a delay circuit input terminal;

a first active gyrator simulating an inductive impedance and connected in series with said delay circuit input terminal;

a capacitor connected in parallel across said gyrator; and said delay adjustment means in the form of an adjustable resistance connected between ground and the end of said capacitor remote from said delay circuit input terminal.

2. The system according to claim 1 wherein said active gyrator comprises:

first and second operational amplifiers, each having an output terminal and inverting and non-inverting input terminals, wherein said capacitor is connected between the delay circuit input terminal and the non-inverting input terminal of said first operational amplifier;

a first resistive impedance connected in series between the delay circuit input terminal and the inverting input terminal of said first operational amplifier;

a second resistive impedance connected in negative feedback relation between the output terminal of said first operational amplifier and the inverting input terminal of that amplifier;

a third resistive impedance connected in series between the output terminal of said first operational amplifier and the inverting input terminal of said second operational amplifier;

a fourth capacitive impedance connected in negative feedback relation between the output and inverting input terminals of said second operational amplifier; and a fifth resistive impedance connected between the output terminal of said second operational amplifier and the non-inverting input terminal of said first operational amplifier;

wherein said delay circuit has an output terminal which corresponds to the output terminal of said first operational amplifier.

3. The system according to claim 2 wherein said first and second resistive impedances are equal.

4. The system according to claim 3 wherein said first resistive impedance is the same in each of said delay circuits, said second resistive impedance is the same in each of said delay circuits, and said fourth capacitive impedance is the same in each of said delay circuits, and said third and fifth resistive impedances are different in each delay circuit and depend upon the frequency to which the delay circuit is tuned.

5. The system according to claim 2 wherein each of said amplitude circuits comprises:
an amplitude circuit input terminal;
an amplitude circuit output terminal;
a third operational amplifier having an inverting input terminal and an output terminal;
a second active gyrator having input and output terminals and an inductive impedance;
a second capacitor;
said amplitude adjustment means in the form of a second adjustable resistance;
means connecting said second adjustable resistance, said second capacitor and said second gyrator in parallel combination between a common junction and ground;
a series resistor connected between said amplitude circuit input terminal and said common junction;
means connecting the output terminal of said second gyrator to said non-inverting input terminal of said third operational amplifier;
an input resistor connected between said amplitude circuit input terminal and said inverting input terminal of said third operational amplifier; and
a feedback resistor connected between the output and inverting input terminals of said third operational amplifier.

6. The system according to claim 5 wherein said input and feedback resistors are of equal resistance.

7. The system according to claim 5 wherein all of said delay adjustment means and all of said amplitude adjustment means are part of a common module which is readily detachable from said system, said delay and amplitude adjustment means each including a manually adjustable member which is accessible at the front panel of said system when said module is attached to said system.

8. The system according to claim 7 wherein said input amplifier means includes gain adjustment means in the form of a potentiometer with a resistance which is substantially linearly related to the gain of said input amplifier means, wherein said potentiometer is part of said common module.

9. The system according to claim 8 wherein said input amplifier means comprises:
an input amplifier input terminal;
an input amplifier output terminal;
a fourth operational amplifier having inverting and non-inverting input terminals and an output terminal;
a sixth resistive impedance connected between said input amplifier input terminal and the inverting input terminal of said fourth operational amplifier;
a seventh resistive impedance connected in negative feedback relation between said output and inverting input terminals of said fourth operational amplifier;
an eighth resistive impedance connected in series between said input amplifier input terminal and the non-inverting input terminal of said fourth operational amplifier; and
said potentiometer connected between the non-inverting input terminal of said fourth operational amplifier and ground.

10. The system according to claim 9 wherein said input amplifier means further comprises:
a fifth operational amplifier having inverting and non-inverting input terminals and an output terminal;
means connecting the output terminal of said fourth operational amplifier to the non-inverting input terminal of said fifth operational amplifier;
a ninth resistive impedance connected between the output terminal of said fifth operational amplifier and said input amplifier output terminal;
a 10th resistive impedance connected between the input amplifier output terminal and the inverting input terminal of said fifth operational amplifier;
an 11th resistive impedance connected between ground and the inverting input terminal of said fifth operational amplifier; and
a 12th resistive impedance and an open-close switch means connected in series between ground and said inverting input terminal of said fifth operational amplifier, said switch means serving as a coarse gain control for said input amplifier means, said switch means being part of said common module.

11. The system according to claim 10 wherein said output amplifier means comprises:
an output amplifier input terminal;
an output transformer having primary and secondary windings;
a sixth operational amplifier having an inverting input terminal and an output terminal;
13th and 14th resistive impedances connected in series between said output amplifier input terminal and the inverting input terminal of said sixth operational amplifier;
a negative voltage feedback path including a 15th resistive impedance connected between the output and inverting input terminals of said sixth operational amplifier; and
a negative current feedback path comprising the primary winding of said transformer connected between the output terminal of said sixth operational amplifier and the junction between said 13th and 14th resistive impedance.

12. The system according to claim 8 wherein said output amplifier means comprises:
an output amplifier input terminal;
an output transformer having primary and secondary windings;
a fourth operational amplifier having an inverting input terminal and an output terminal;
sixth and seventh resistive impedances connected in series between said output amplifier input terminal and the inverting input terminal of said fourth operational amplifier;
a negative voltage feedback path including an eighth resistive impedance connected between the output and inverting input terminals of said fourth operational amplifier; and
a negative current feedback path comprising the primary winding of said transformer connected between the output terminal of said fourth operational amplifier and the junction between said sixth and seventh resistive impedances;
wherein said sixth resistive impedance is very much smaller than said seventh resistive impedance, and wherein said eighth resistive impedance is approximately twice as large as said seventh resistive impedance.

13. The system according to claim 5 wherein said input amplifier means includes gain adjustment means in the form of a potentiometer with a resistance which is substantially linearly related to the gain of said input amplifier means.

14. The system according to claim 5 wherein said second active gyrator comprises:
fourth and fifth operational amplifiers, each having an output terminal and inverting and non-inverting input terminals, wherein said second capacitor is connected between ground and the non-inverting input terminal of said fourth operational amplifier;
a sixth resistive impedance connected between ground and the inverting input terminal of said fourth operational amplifier;
a seventh resistive impedance connected in negative feedback relation between the output terminal of said fourth operational amplifier and the inverting input terminal of that amplifier;
an eighth resistive impedance connected in series between the output terminal of said fourth operational amplifier and the inverting input terminal of said fifth operational amplifier;
a ninth capacitive impedance connected in negative feedback relation between the output and inverting input terminals of said fifth operational amplifier; and
a 10th resistive impedance connected between the output terminal of said fifth operational amplifier and the non-inverting input terminal of said fourth operational amplifier.

15. The system according to claim 2 wherein all of said delay adjustment means and all of said amplitude adjustment means are part of a common module which is readily detachable from said system, said delay and amplitude adjustment means each including a manually adjustable member which is accessible at the front panel of said system when said module is attached to said system.

16. The system according to claim 2 wherein said input amplifier means includes gain adjustment means in the form of a potentiometer with a resistance which is substantially linearly related to the gain of said input amplifier means, wherein said potentiometer is part of said common module.

17. A line conditioner system providing adjustable compensation for frequency-dependent distortion introduced by a transmission line onto signals within a prescribed frequency range which are transmitted along the transmission line, said system comprising:
broadband input amplifier means arranged to receive signals from said transmission line, said broadband amplifier having an adjustable gain for all signal frequencies in said prescribed frequency range;
a plurality of cascaded delay circuits connected in cascade with said broadband amplifier means, each delay circuit being tuned to a different frequency within said prescribed frequency range and including delay adjustment means for adjusting signal delay therethrough in a relatively small range of frequencies centered at said tuned frequency, each delay circuit having a constant gain versus frequency characteristic;
a plurality of cascaded amplitude circuits connected in cascade with said delay circuits, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vary the bandwidth and mid-band frequency gain of said circuit such that the product of said bandwidth and mid-band frequency gain is independent of adjustments of said amplitude adjustment means; and
output amplifier means connected in cascade with said delay and amplitude circuits for providing an output signal from said system and providing a system output impedance which is matched to a predetermined impedance;
wherein each of said amplitude circuits comprises:
an amplitude circuit input terminal;
an amplitude circuit output terminal;
a first operational amplifier having an inverting input terminal and an output terminal;
an active gyrator having input and output terminals and an inductive impedance;
a capacitor;
said amplitude adjustment means in the form of an adjustable resistance;
means connecting said adjustable resistance, said capacitor and said gyrator in parallel combination between a common junction and ground;
a series resistor connected between said amplitude circuit input terminal and said common junction;
means connecting the output terminal of said gyrator to said non-inverting input terminal of said first operational amplifier;
an imput resistor connected between said amplitude circuit input terminal and said inverting input terminal of said first operational amplifier; and
a feedback resistor connected between the output and inverting input terminals of said first operational amplifier.

18. The system according to claim 17 wherein said input and feedback resistors are of equal resistance.

19. The system according to claim 18 wherein all of said delay adjustment means and all of said amplitude adjustment means are part of a common module which is readily detachable from said system, said delay and amplitude adjustment means each including a manually adjustable member which is accessible at the front panel of said system when said module is attached to said system.

20. The system according to claim 18 wherein said active gyrator comprises:
second and third operational amplifiers, each having an output terminal and inverting and non-inverting input terminals, wherein said capacitor is connected between ground and the non-inverting input terminal of said second operational amplifier;
a first resistive impedance connected in series between ground and the inverting input terminal of said second operational amplifier;
a second resistive impedance connected in negative feedback relation between the output terminal of said second operational amplifier and the inverting input terminal of that amplifier;
a third resistive impedance connected in series between the output terminal of said second operational amplifier and the inverting input terminal of said third operational amplifier;

a fourth capacitive impedance connected in negative feedback relation between the output and inverting input terminals of said third operational amplifier; and a fifth resistive impedance connected between the output terminal of said third operational amplifier and the non-inverting input terminal of said second operational amplifier.

21. The system according to claim 20 wherein said input amplifier means comprises:

an input amplifier input terminal;

an input amplifier output terminal;

a fourth operational amplifier having inverting and non-inverting input terminals and an output terminal;

a sixth resistive impedance connected between said input amplifier input terminal and the inverting input terminal of said fourth operational amplifier;

a seventh resistive impedance connected in negative feedback relation between said output and inverting input terminals of said fourth operational amplifier;

an eighth resistive impedance connected in series between said input amplifier input terminal and the non-inverting input terminal of said fourth operational amplifier; and said potentiometer connected between the non-inverting input terminal of said fourth operational amplifier and ground.

22. The system according to claim 20 wherein said output amplifier means comprises:

an output amplifier input terminal;

an output transformer having primary and secondary windings;

a fifth operational amplifier having an inverting input terminal and an output terminal;

ninth and tenth resistive impedances connected in series between said output amplifier input terminal and the inverting input terminal of said fifth operational amplifier;

a negative voltage feedback path including an eleventh resistive impedance connected between the output and inverting input terminals of said fifth operational amplifier; and a negative current feedback path comprising the primary winding of said transformer connected between the output terminal of said fifth operational amplifier and the junction between said ninth and tenth resistive impedances;

wherein said ninth resistive impedance is very much smaller than said 10th resistive impedance, and wherein said 11th resistive impedance is approximately twice as large as said 10th resistive impedance.

23. A line conditioner system providing adjustable compensation for frequency-dependent distortion introduced by a transmission line onto signals within a prescribed frequency range which are transmitted along the transmission line, said system comprising:

broadband input amplifier means arranged to receive signals from said transmission line, said broadband amplifier having an adjustable gain for all signal frequencies in said prescribed frequency range;

a plurality of cascaded delay circuits connected in cascade with said broadband amplifier means, each delay circuit being tuned to a different frequency within said prescribed frequency range and including delay adjustment means for adjusting signal delay therethrough in a relatively small range of frequencies centered at said tuned frequency, each delay circuit having a constant gain versus frequency characteristic;

a plurality of cascaded amplitude circuits connected in cascade with said delay circuits, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vary the bandwidth and mid-band frequency gain of said circuit such that the product of said bandwidth and mid-band frequency gain is independent of adjustments of said amplitude adjustment means; and output amplifier means connected in cascade with said delay and amplitude circuits for providing an output signal from said system and providing a system output impedance which is matched to a predetermined impedance;

wherein said input amplifier means includes gain adjustment means in the form of a potentiometer with a resistance which is substantially linearly related to the gain of said input amplifier means and wherein said input amplifier means comprises:

an input amplifier input terminal;

an input amplifier output terminal;

a first operational amplifier having inverting and non-inverting input terminals and an output terminal;

a resistive impedance connected between said input amplifier input terminal and the inverting input terminal of said operational amplifier;

a resistive impedance connected in negative feedback relation between said output and inverting input terminals of said operational amplifier;

a resistive impedance connected in series between said input amplifier input terminal and the non-inverting input terminal of said operational amplifier; and said potentiometer connected between the non-inverting input terminal of said first operational amplifier and ground.

24. The system according to claim 23 wherein said input amplifier means further comprises:

a second operational amplifier having inverting and non-inverting input terminals and an output terminal;

means connecting the output terminal of said first operational amplifier to the non-inverting input terminal of said second operational amplifier;

a fifth resistive impedance connected between the output terminal of said second operational amplifier and said input amplifier output terminal;

a sixth resistive impedance connected between the input amplifier output terminal and the inverting input terminal of said second operational amplifier;

a seventh resistive impedance connected in between ground and the inverting input terminal of said second operational amplifier; and an eighth resistive impedance and an open-close switch means connected in series between ground and said inverting input terminal of said second operational amplifier, said switch means serving as a coarse gain control for said input amplifier means.

25. The system according to claim 24 wherein all of said delay adjustment means and all of said amplitude adjustment means are part of a common module which is readily detachable from said system, said delay and amplitude adjustment means each including a manually adjustable member which is accessible at the front panel of said system when said module is attached to said system.

26. The system according to claim 23 wherein said output amplifier means comprises:

an output amplifier input terminal;

an output transformer having primary and secondary windings;

a second operational amplifier having an inverting input terminal and an output terminal;

fifth and sixth resistive impedances connected in series between said output amplifier input terminal and the inverting input terminal of said second operational amplifier;

a negative voltage feedback path including a seventh resistive impedance connected between the output and inverting input terminals of said second operational amplifier; and a negative current feedback path comprising the primary winding of said transformer connected between the output terminal of said second operational amplifier and the junction between said fifth and sixth resistive impedances;

wherein said fifth resistive impedance is very much smaller than said sixth resistive impedance, and wherein said seventh resistive impedance is approximately twice as large as said sixth resistive impedance.

27. A line conditioner system providing adjustable compensation for frequency-dependent distortion introduced by a transmission line onto signals within a prescribed frequency range which are transmitted along the transmission line, said system comprising:

broadband input amplifier means arranged to receive signals from said transmission line, said broadband amplifier having an adjustable gain for all signal frequencies in said prescribed frequency range;

a plurality of cascaded delay circuits connected in cascade with said broadband amplifier means, each delay circuit being tuned to a different frequency within said prescribed frequency range and including delay adjustment means for adjusting signal delay therethrough in a relatively small range of frequencies centered at said tuned frequency, each delay circuit having a constant gain versus frequency characteristic;

a plurality of cascaded amplitude circuits connected in cascade with said delay circuits, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vaiy the bandwidth and mid-band frequency gain of said circuit such that the product of said bandwidth is independent of adjustments of said amplitude adjustment means; and output amplifier means connected in cascade with said delay and amplitude circuits for providing an output signal from said system and providing a system output impedance which is matched to a predetermined impedance;

wherein said output amplifier means comprises:

an output amplifier input terminal;

an output transformer having primary and secondary windings;

an operational amplifier having an inverting input terminal and an output terminal;

first and second resistive impedances connected in series between said output amplifier input terminal and the inverting input terminal of said operational amplifier;

a negative voltage feedback path including a third resistive impedance connected between the output and inverting input terminals of said operational amplifier; and a negative current feedback path comprising the primary winding of said transformer connected between the output terminal of said operational amplifier and the junction between said first and second resistive impedances;

wherein said first resistive impedance is very much smaller than said second resistive impedance, and wherein said third resistive impedance is approximately twice as large as said second resistive impedance.

28. A line conditioner system providing adjustable compensation for frequency-dependent distortion introduced by a transmission line onto signals within a prescribed frequency range which are transmitted along the transmission line, said system comprising:

broadband input amplifier means arranged to receive signals from said transmission line, said broadband amplifier having an adjustable gain for all signal frequencies in said prescribed frequency range;

a plurality of cascaded delay circuits connected in cascade with said broadband amplifier means, each delay circuit being tuned to a different frequency within said prescribed frequency range and including delay adjustment means for adjusting signal delay therethrough in a relatively small range of frequencies centered at said tuned frequency, each delay circuit having a constant gain versus frequency characteristic;

a plurality of cascaded amplitude circuits connected in cascade with said delay circuits, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vary the bandwidth and mid-band frequency gain of said circuit such that the product of said bandwidth and mid-band frequency gain is independent of adjustments of said amplitude adjustment means; and output amplifier means connected in cascade with said delay and amplitude circuits for providing an output signal from said system and providing a system output impedance which is matched to a predetermined impedance;

wherein all of said delay adjustment means and all of said amplitude adjustment means are part of a common module which is readily detachable from said system, said delay and amplitude adjustment means each including a manually adjustable member which is accessible at the front panel of said system when said module is attached to said system.

29. A line conditioner system providing adjustable compensation for frequency-dependent delay distortion introduced by a transmission line onto signals within a prescribed frequency range which are transmitted along the transmission line, said system comprising:

input means arranged to receive signals from said transmission line; and a plurality of cascaded delay circuits connected in cascade with said input means, each delay circuit being tuned to a different frequency within said prescribed frequency range and including delay adjustment means for adjusting signal delay therethrough in a relatively small range of frequencies centered at said tuned frequency, each delay circuit being characterized by:

a delay circuit input terminal;

an active gyrator simulating an inductive impedance and connected in series with said delay circuit input terminal;

a capacitor connected in parallel across said gyrator; and said delay adjustment means in the form of an adjustable resistance connected between ground and the end of said capacitor remote from said delay circuit input terminal.

30. The system according to claim 29 wherein said active gyrator comprises:

first and second operational amplifiers, each having an output terminal and inverting and non-inverting input terminals, wherein said capacitor is connected between the delay circuit input terminal and the non-inverting input terminal of said first operational amplifier;

a first resistive impedance connected in series between the delay circuit input terminal and the inverting input terminal of said first operational amplifier;

a second resistive impedance connected in negative feedback relation between the output terminal of said first operational amplifier and the inverting input terminal of that amplifier;

a third resistive impedance connected in series between the output terminal of said first operational amplifier and the inverting input terminal of said second operational amplifier;

a fourth capacitive impedance connected in negative feedback relation between the output and inverting input terminals of said second operational amplifier; and a fifth resistive impedance connected between the output terminal of said second operational amplifier and the non-inverting input terminal of said first operational amplifier;

wherein said delay circuit has an output terminal which corresponds to the output terminal of said first operational amplifier.

31. The system according to claim 30 wherein said first and second resistive impedances are equal.

32. The system according to claim 31 wherein said first resistive impedance is the same in each of said delay circuits, said second resistive impedance is the same in each of said delay circuits, and said fourth capacitive impedance is the same in each of said delay circuits, and said third and fifth resistive impedances are different in each delay circuit and depend upon the frequency to which the delay circuit is tuned.

33. A line conditioner system providing adjustable compensation for frequency-dependent amplitude distortion introduced by a transmission line onto signals within a prescribed frequency range which are transmitted along the transmission line, said system comprising:

input means arranged to receive signals from said transmission line; and a plurality of cascaded amplitude circuits connected in cascade with said input means, each amplitude circuit being tuned to a different mid-band frequency within said prescribed frequency range and including amplitude adjustment means for adjusting circuit gain in a relatively small range of frequencies centered at said tuned frequency, said amplitude adjustment means being connected to vary the bandwidth and mid-band frequency gain of said circuit such that the product of said bandwidth and mid-band frequency gain is independent of adjustments of said amplitude adjustment means;

wherein each of said amplitude circuits comprises:

an amplitude circuit input terminal;

an amplitude circuit output terminal;

a first operational amplifier having an inverting input terminal and an output terminal;

an active gyrator having input and output terminals and an inductive impedance;

a capacitor;

said amplitude adjustment means in the form of an adjustable resistance;

means connecting said adjustable resistance, said capacitor and said gyrator in parallel combination between a common junction and ground;

a series resistor connected between said amplitude circuit input terminal and said common junction;

means connecting the output terminal of said gyrator to said non-inverting input terminal of said first operational amplifier;

an input resistor connected between said amplitude circuit input terminal and said inverting input terminal of said first operational amplifier; and a feedback resistor connected between the output and inverting input terminals of said first operational amplifier.

34. The system according to claim 33 wherein said input and feedback resistors are of equal resistance.

35. The system according to claim 34 wherein said active gyrator comprises:

second and third operational amplifiers, each having an output terminal and inverting and non-inverting input terminals, wherein said capacitor is connected between ground and the non-inverting input terminal of said second operational amplifier;

a first resistive impedance connected in series between ground and the inverting input terminal of said second operational amplifier;

a second resistive impedance connected in negative feedback relation between the output terminal of said second operational amplifier and the inverting input terminal of that amplifier;

a third resistive impedance connected in series between the output terminal of said second operational amplifier and the inverting input terminal of said third operational amplifier;

a fourth capacitive impedance connected in negative feedback relation between the output and inverting input terminals of said third operational amplifier; and a fifth resistive impedance connected between the output terminal of said third operational amplifier and the non-inverting input terminal of said second operational amplifier.

* * * * *